April 20, 1954
D. W. SHERMAN
2,676,030
AUTOMOBILE FRAME
Filed Nov. 29, 1948
3 Sheets-Sheet 1
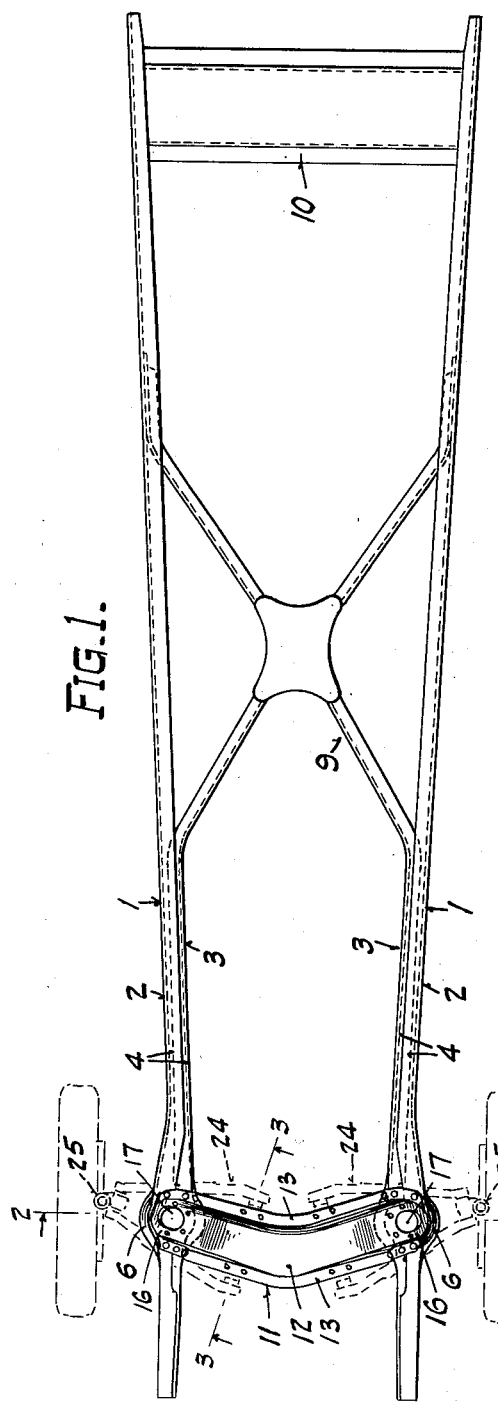
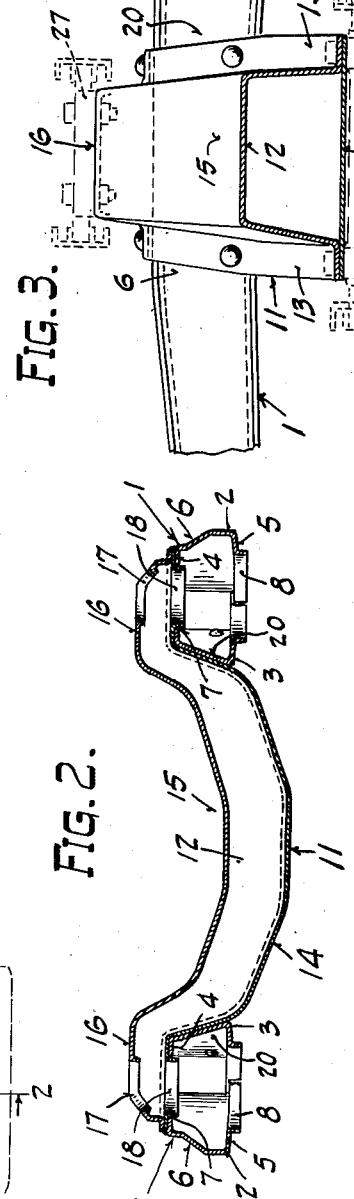
INVENTOR.
Donald W. Sherman
BY Andrus & Sceales
ATTORNEYS.

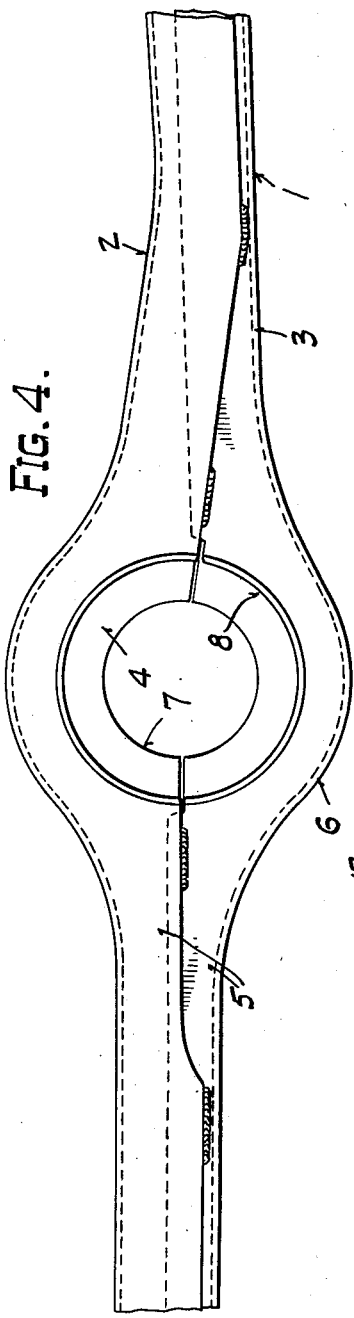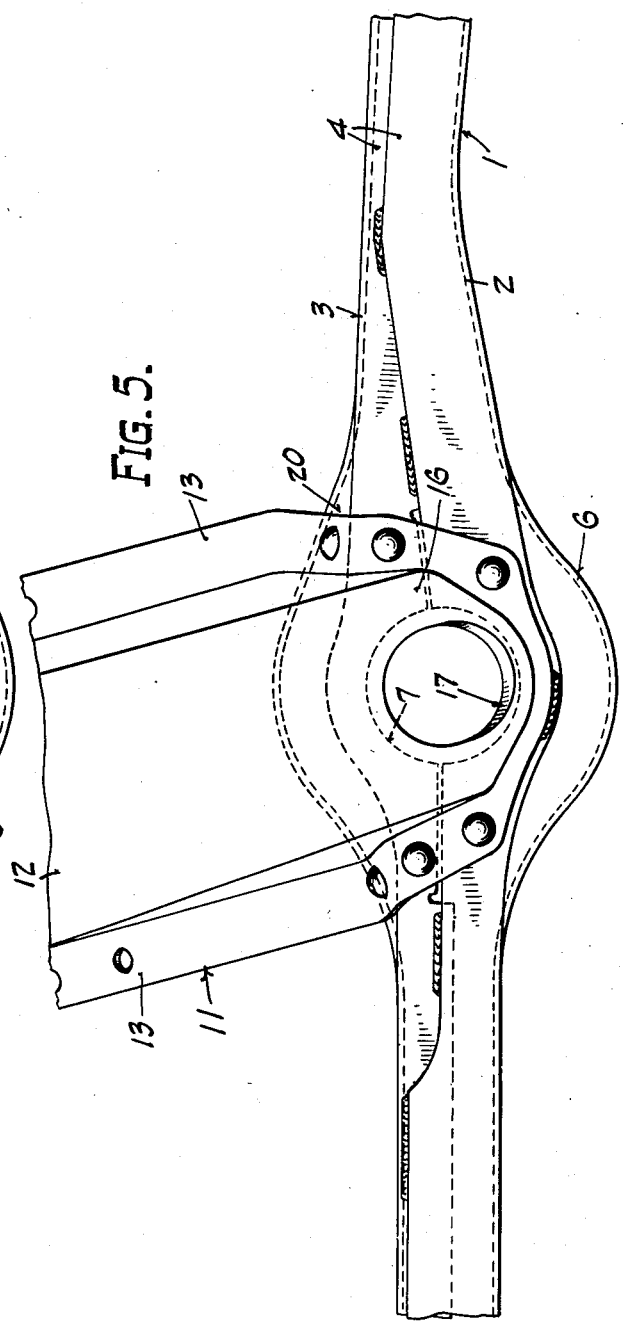

April 20, 1954 D. W. SHERMAN 2,676,030
AUTOMOBILE FRAME
Filed Nov. 29, 1948 3 Sheets-Sheet 3

INVENTOR.
Donald W. Sherman
BY
ATTORNEYS.

Patented Apr. 20, 1954

2,676,030

UNITED STATES PATENT OFFICE 2,676,030

AUTOMOBILE FRAME

Donald W. Sherman, Milwaukee, Wis., assignor to A. O. Smith Corporation, Milwaukee, Wis., a corporation of New York Application November 29, 1948, Serial No. 62,454

12 Claims. (Cl. 280—106)

This invention relates to an automobile frame and constitutes an improvement in the invention disclosed and claimed in Patent No. 1,965,561, July 3, 1934, of the present inventor, entitled "Automobile Frame" and assigned to the assignee of the present application.

The invention is adaptable for use in automobiles having independently sprung front wheel mountings and particularly to such automobiles when employing telescopic shock absorbers. Independently sprung front wheel mountings eliminate the necessity of employing a front axle extending across the car between the wheels, and as is well recognized, provides many advantages resulting in easier riding and steering of the car.

An object of the invention is to provide a strong lightweight frame which is particularly adapted for independently sprung front wheel mountings.

Another object is to provide a frame which is more compact and therefore of greater strength and durability.

A further object is to provide a frame which eliminates the necessity of employing expensive and complicated sub-assemblies for the frame to reinforce the same at points where the front coil springs and front shock absorbers are carried.

Another object is to provide a frame which is lighter in weight, requires less steel for the frame, requires fewer forming operations and is less costly to assemble because of better accessibility for welding and riveting operations.

Another object is to provide a frame in which the torsional strength of the side rails is carried forward to the front end of the rails.

Other objects will appear hereinafter.

The accompanying drawing illustrates one embodiment of the invention in which:

Figure 1 is a top plan view of the frame;

Fig. 2 is an enlarged transverse section on line 2—2 of Figure 1 showing the construction of the front cross-bar;

Fig. 3 is an enlarged section taken on line 3—3 of Figure 1 showing the cross-bar;

Fig. 4 is a bottom plan view of the forward end portion of the frame side rail;

Fig. 5 is a top plan view of a portion of the frame showing one manner of securing the cross member to the side rail;

Figure 6:
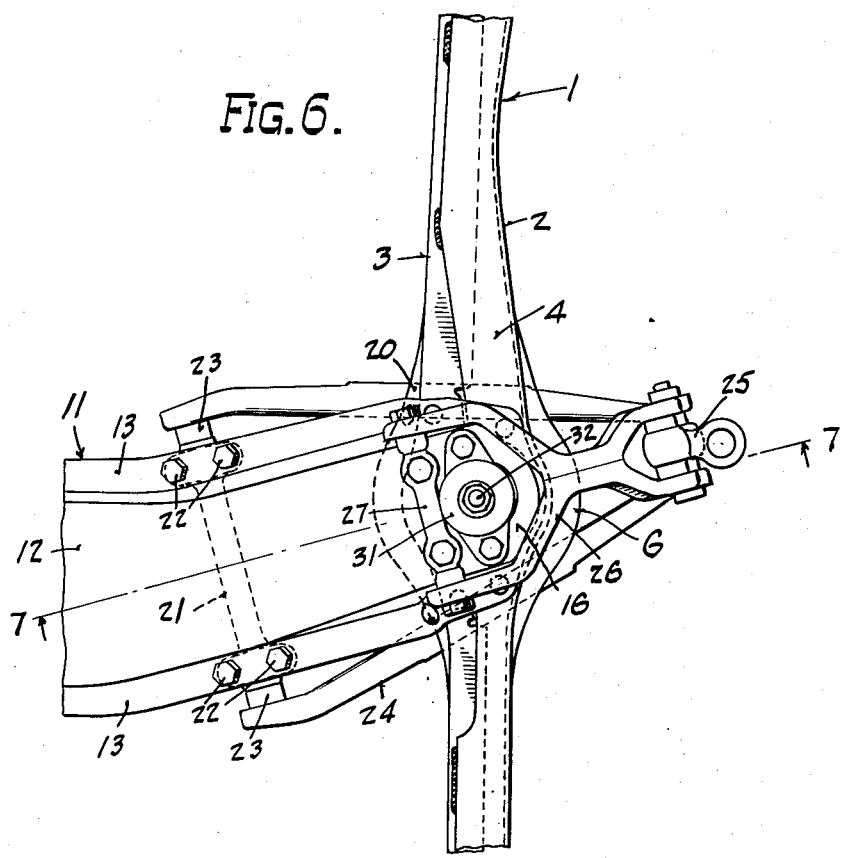
Fig. 6 is a top plan view of one side of the front end of the frame showing the use of the frame with one type of wheel mounting for which it is adapted.
Figure 7:
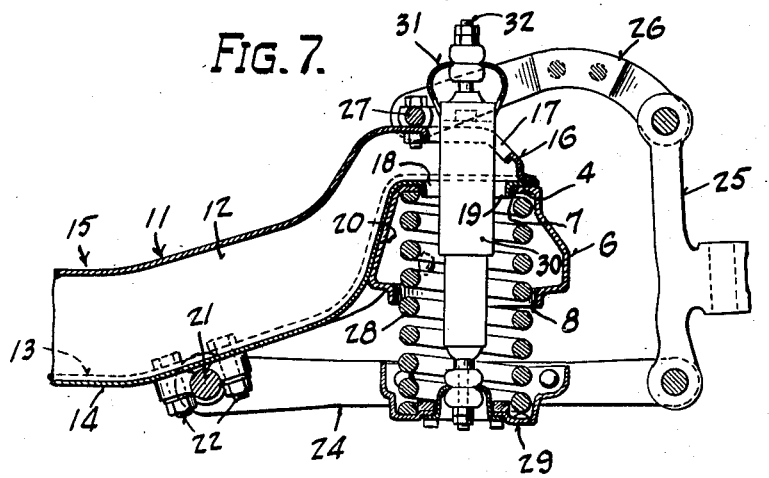
Fig. 7 is a sectional view taken on line 7—7 of Fig. 6 with parts in elevation.

The frame consists principally of channel-shaped members formed into box construction which serve as side rails, and cross-bars.

The side rails 1 are of box-like construction formed from a pair of channel members, the outer channel member being designated 2, the inner one 3. These channel members are made complementary to each other, the channel 3 fitting into the channel 2, so that when they are secured together at their upper and lower flanges 4 and 5, respectively, preferably by welding, they form a side rail of box construction.

A banjo portion 6 is provided in each side rail at approximately the center line of the front wheels by blanking and forming each channel member 2 and 3 with a semicircular portion to form a generally circular design therebetween providing opening 7 in the upper flanges 4 and opening 8 in the lower flanges 5. The banjo 6 is substantially in the transverse vertical central plane of the front wheels so as not to interfere with the turning of the wheels for steering.

The side rails 1 are extended forwardly an appreciable distance to provide means for attaching a bumper, etc. The box construction of forwardly extended side rails 1 serves to support the more massive sheet metal parts being carried on the modern cars.

The frame may comprise as many cross-bars as are desirable. The frame illustrated has an X-shaped cross-bar 9 at the center, and a rear cross-bar 10 at the rear end. The bars 9 and 10 may be of any suitable construction, but preferably bar 9 is formed from portions of inner channel member 3 of each side rail 1. If a box type frame is desired, the inner channel member 3 may extend the full length of and be secured to outer channel member 2 to form side rails of box construction.

The front cross-bar 11 comprises an integral sheet metal inverted U or channel section 12 having outwardly extending flanges 13 at its lower edges. A reinforcing plate 14 is secured, preferably by welding to the outwardly extending flanges 13.

The central portion 15 of the cross-bar 11 is depressed downwardly to pass under the forward end of the engine and radiator, not shown. The cross-bar 11 may be ribbed if desired to strengthen the same at any point.

The outer ends 16 of the cross-bar 11 overlie the banjo portions of the side rails 1 and are secured thereto. An opening 17 is provided in the upper web of the ends 16 of the cross-bar, and is aligned generally with openings 7 and 8 in the side rails.

Reinforcing plate 14 is secured to cross-bar 11 throughout the length of the latter and has a flanged opening 18 therethrough at each end in general alignment with openings 7, 8 and 17.

The downwardly turned flange 19 at opening 18 extends through the opening 7 and cooperates with the upper flanges 4 of frame channel members 2 and 3 at the banjo to form a seat for the upper end of the front compression springs. The lower flanges 5 of channel members 2 and 3 are flanged downwardly at opening 8 to strengthen the frame and serve to enclose the front springs.

Cross-bar 11 is secured to the upper face of side bars 1 preferably by welding and riveting, and to the web 20 of each inner channel members 3 preferably by riveting.

In this form of construction the necessity for cutting through the box construction side bars to secure the cross-member to the side bars has been eliminated, thereby providing an exceedingly strong frame portion where it is greatly needed and desired.

The box side rail extends forwardly to the bumper, thereby providing the full strength of the rail at its forward end.

Spaced rods 21 are secured to the flanges 13 of cross-bar 11 by bolts 22 and extend transversely beneath the cross-bar. A bearing 23 is provided at each end of each rod 21. A wishbone member 24 is pivoted to each pair of bearings and extends laterally outward and its outer end is pivoted to the lower end of the vertical spindle link 25 of the front wheel of the car. The upper end of link 25 is pivoted to arm 26 which is pivoted to bearing member 27 secured to end 16 of cross-bar 11. This parallel arm mounting of spindle link 25 maintains the wheel in a substantially vertical position at all times.

A compression coil spring 28 is mounted at each end of the cross-bar 11 within the banjo portion of each side rail 1. The upper end of the springs seats on flanges 4 and the lower end is confined by a tray 29 supported by the wishbone member 24. These springs, it will be noted, are free to operate through the openings 8 in the side rails 1.

Shock absorbers 30 are provided for the front of the car and extend downwardly through openings 17, 18 and 8, respectively, and through compression springs 28. The upper end of each shock absorber is secured to a bracket 31 bolted to the upper face of end portion 16 of the cross member and straddling the opening 17. A threaded stem 32 on the upper end of each shock absorber extends through an opening in bracket 31 and is secured thereto by suitable retainers and nuts, the latter engaging the threaded end of stem 32. The lower end of each shock absorber is similarly secured to the tray 29 secured to wishbone member 24. The shock absorbers are free to work vertically within the compression springs 28, and by virtue of being substantially enclosed by the side rails, the cross-bar, and the compression springs, are afforded a measure of protection from accidental damage.

The invention provides a frame construction of great strength which incorporates a front cross member secured to the top of the side rails thereby eliminating the necessity of cutting through the side rails to secure the cross-bar thereto. In addition, an appreciable amount of savings is inherent in the construction because fewer forming operations are required, several bracket assemblies are eliminated and the cost of assembling the frame is considerably reduced. The invention also permits the inner reinforcing rails to be carried forward beyond the cross member thus reinforcing the main rail's lower flanges around the coil spring and providing a stronger section forward of the cross member. The cross member also contains all of the holes required for the mounting of the wheel connector links so the holes can be accurately positioned in relation to each other.

Various embodiments of the invention may be employed within the scope of the accompanying claims.

I claim:

1. In a vehicle frame of the class described, a side rail having its forward end composed of two continuous channel members facing each other with their webs vertical and forming the sides of the rail and with their horizontal flanges secured together, said channel members being spread apart to form a banjo providing a vertical space within said member at a location for receiving a coil spring of a wheel carrier support for the frame, the lower flanges of said channel members at said banjo being opened for receiving the spring upwardly therethrough, and the upper flanges of said channel members extending inwardly into the vertical space formed by the banjo a greater distance than the lower flanges of the channel members to receive the upper end of the spring.

2. In a vehicle frame of the class described, a side rail having its forward end composed of two continuous channel members facing each other with their webs vertical and forming the sides of the rail and with their horizontal flanges secured together, said channel members being spread apart to form a banjo at a location for receiving a coil spring of a wheel carrier support for the frame, the lower flanges of said channel members at said banjo being opened for receiving the spring upwardly therethrough, the upper flanges of said channel members providing a seat for the upper end of the spring, a cross-bar having its end shaped to receive said side rail and extending over the top of said banjo, and means securing said cross-bar to the inner side web of the inner channel member and to the top flanges of both channel members to reinforce the banjo.

3. An automobile frame adapted for independently sprung front wheel mountings, comprising two opposed side rails of box construction formed from opposed channel-shaped members, each side rail having a banjo portion formed by its opposite sides being curved outwardly away from each other near the forward end thereof and in substantially the transverse vertical central plane of the forward wheels, and a front cross-bar extending between said side rails and secured intermediate its ends to the side face of each of said side rails and at its ends to said banjo portions of the side rails.

4. An automobile frame adapted for independently sprung front wheel mounting, comprising two opposed side rails of box construction each formed from two opposed channel-shaped members, each of said side rails having a portion curved outwardly from one of said channel members and a portion curved inwardly from the other of said channel members, said curved portions being opposed and extending beyond the normal line of the side rail near the forward end thereof, and a front cross bar extending between said side rails and secured intermediate its ends to the side face of one of said rails and at its ends to said inwardly and outwardly curved portions of the side rails, said cross-bar being of box construction and formed from a channel member of inverted U-shaped cross section having lateral flanges at the lower edges thereof, and a reinforcing plate member secured to the lower face of the lateral flanges.

5. An automobile frame adapted for independently sprung front wheel mounting, comprising two opposed side rails of box construction each formed from two opposed channel-shaped members, each of said side rails having an opening therein formed from an outwardly curved portion of one of said channel members and an inwardly curved portion formed from the other of said channel members, said curved portions being oppositely disposed and extending beyond the normal line of the side rail and in substantially the transverse plane of the forward wheels, a front cross-bar extending between said side rails and secured intermediate its ends to the side face of one of said channel members and at its ends to the top face of said curved portions of the side rail.

6. An automobile frame adapted for independently sprung front wheel mounting, comprising two opposed side rails of box construction each formed from two opposed channel members, each of said side rails having opposed inwardly and outwardly curved portions extending laterally beyond the normal line of the side rail near the forward end thereof, and in substantially the transverse vertical plane of the forward wheels, each said side rails having its flanges on the upper side extending inwardly a greater distance than the flanges on the lower side of each side rail to provide the upper flanges as a seat on the inner top face of each side rail for receiving a coil spring, and a front cross-bar extending between said side rails and secured at its ends to said curved portions of the top face of each side rail to strengthen said seat.

7. An automobile frame adapted for independently sprung front wheel mounting, comprising two opposed side rails of box construction, each side rail being formed from two opposed channel members having flanges at the top and bottom, each of said side rails having opposed inwardly and outwardly curved portions extending laterally beyond the normal line of the side rail to form an opening therethrough near the forward end thereof and in substantially the transverse vertical plane of the forward wheels, the upper flanges of each of said side rails being downwardly turned around the opening in rails to provide a seat on the inner top face of each side rail for receiving a coil spring and the lower flanges of each side rail being downwardly turned around the opening in the rails to strengthen the frame and enclose the coil springs, a front cross-bar having a vertical opening extending therethrough near the ends of the cross-bar in vertical alignment with the opening in the side rails to receive a shock absorber therein, said cross-bar extending between said side rails and having a flange at each upper outer end downwardly turned over the upper flanges of said side rails around the opening in the rails to strengthen the seats for the coil springs and secured at its ends to said curved portions of the top face of the side rails.

8. An automobile frame adapted for independently sprung front wheel mounting, comprising two opposed side rails of box construction, each side rail being formed from two opposed members having flanges at the top and bottom and having inwardly and outwardly curved portions extending laterally beyond the normal line of the side rail to form an opening therethrough and near the forward end thereof in substantially the transverse vertical plane of the forward wheels, the said flanges at the top of the rails being downwardly turned around said opening to provide a seat in the top of each rail for receiving a coil spring a front cross-bar of substantially box construction extending between said side rails and having openings therethrough in substantial vertical alignment with the openings in said side rails, flanges on each end of the cross-bar downwardly turned over the upper flange of each side rail around said openings to strengthen the seats in the rails for the coil springs and said front cross-bar being secured at its ends to the top face of the rails.

9. In a vehicle frame of the class described, a side rail having its forward end composed of two continuous channel members facing each other with their webs vertical and forming the sides of the rail and with their horizontal flanges secured together, said channel members being spread apart to form a banjo at a location for receiving a coil spring of a wheel carrier support for the frame, the lower flanges of said channel members at said banjo being opened for receiving the spring upwardly therethrough, the upper flanges of said channel members providing a seat for the upper end of the spring, a crossbar having its end shaped to receive said side rail and extending over the top of said banjo, means securing said cross-bar to the inner side web of the inner channel member and to the top flanges of both channel members, said cross-bar having an opening therein aligned with the opening in the lower flanges of said channel member, and the upper flanges of said channel members having a corresponding opening therein registering with the opening in the cross-bar to receive a shock absorber centrally of the coil spring.

10. In a vehicle frame of the class described, a side rail having its forward end composed of two continuous channel members facing each other with their webs vertical and forming the sides of the rail and with their horizontal flanges secured together, said channel members being spread apart to form a banjo at a location for receiving a coil spring of a wheel carrier support for the frame, the lower flanges of said channel members at said banjo being opened for receiving the spring upwardly therethrough, the upper flanges of said channel members providing a seat for the upper end of the spring, a cross-bar having its end shaped to receive said side rail and extending over the top of said banjo, means securing said cross-bar to the inner side web of the inner channel member and to the top flanges of both channel members, said cross-bar having an opening therein aligned with the opening in the lower flanges of said channel member, the upper flanges of said channel members having a corresponding opening therein registering with the opening in the cross-bar to receive a shock absorber centrally of the coil spring, and a member of said cross-bar being flanged downwardly through the opening in the upper flanges of the channel members to serve as a centering means for the upper end of the spring.

11. In a vehicle frame of the class described, a side rail having its forward end composed of two continuous channel members facing each other with their webs vertical and forming the sides of the rail and with their horizontal flanges secured together, said channel members being spread apart to form a banjo at a location for receiving a coil spring of a wheel carrier support for the frame, the lower flanges of said channel members at said banjo being opened for receiving the spring upwardly therethrough, the upper flanges of said channel members providing a seat for the upper end of the spring and having an opening therethrough centrally of the seat, a cross-bar composed of an inverted channel member closed by a bottom plate and having its end formed to abut the side web of the inner channel member and to extend over the top of said banjo, and means to secure said cross-bar to the inner side web and top of said side rail, said cross-bar being adapted to support a shock absorber at its end and having openings therethrough registering with the opening in the upper flanges of the channel side rail members for receiving an operating member of the shock absorber extending vertically through the center of the coil spring.

12. In a vehicle frame of the class described, a side rail having its forward end composed of two continuous channel members facing each other with their webs vertical and forming the sides of the rail and with their horizontal flanges secured together, said channel members being spread apart to form a banjo at a location for receiving a coil spring of a wheel carrier support for the frame, the lower flanges of said channel members at said banjo being opened for receiving the spring upwardly therethrough, the upper flanges of said channel members providing a seat for the upper end of the spring and having an opening therethrough centrally of the seat, a cross-bar composed of an inverted channel member closed by a bottom plate and having its end formed to abut the side web of the inner channel member and to extend over the top of said banjo, means to secure said cross-bar to the inner side web and top of said side rail, said cross-bar being adapted to support a shock absorber at its end and having openings therethrough registering with the opening in the upper flanges of the channel side rail members for receiving an operating member of the shock absorber extending vertically through the center of the coil spring, and said bottom plate of the cross-bar being flanged downwardly through the opening in the upper flanges of the channel side rail members to serve as a centering means preventing displacement of the spring from its seat in the side rail.

References Cited in the file of this patent

UNITED STATES PATENTS

| Number | Name | Date |
| --- | --- | --- |
| 2,115,913 | Hicks | May 3, 1938 |
| 2,174,915 | Dietrich | Oct. 3, 1939 |
| 2,389,907 | Helmuth | Nov. 27, 1945 |
| 2,611,627 | Reynolds | Sept. 23, 1952 |